United States Patent
Godaliyadda et al.

(10) Patent No.: US 12,494,068 B2
(45) Date of Patent: Dec. 9, 2025

(54) FREE SPACE DETECTION AND PARK-ABLE FREE SPACE DETECTION FOR OCCUPANCY GRIDS USING SENSOR MEASUREMENTS

(71) Applicant: TEXAS INSTRUMENTS INCORPORATED, Dallas, TX (US)

(72) Inventors: Gunawath Dilshan Godaliyadda, Allen, TX (US); Vijay Kumar Pothukuchi, Allen, TX (US); Do-Kyoung Kwon, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 507 days.

(21) Appl. No.: 17/538,134

(22) Filed: Nov. 30, 2021

(65) Prior Publication Data
US 2023/0169781 A1 Jun. 1, 2023

(51) Int. Cl.
*G06V 20/58* (2022.01)
*B60W 30/06* (2006.01)

(52) U.S. Cl.
CPC ........... *G06V 20/586* (2022.01); *B60W 30/06* (2013.01); *B60W 2420/403* (2013.01); *B60W 2530/201* (2020.02); *B60W 2552/53* (2020.02)

(58) Field of Classification Search
None
See application file for complete search history.

(56) References Cited

U.S. PATENT DOCUMENTS

2005/0137791 A1* 6/2005 Agrawala ............... G06T 11/60
701/454
2013/0332060 A1* 12/2013 Chowdhary ......... G06Q 10/087
701/300
(Continued)

FOREIGN PATENT DOCUMENTS

CN    112313477 A  *  2/2021  ............. G01C 21/32
DE   102016122294 A1 *  5/2018  ........... B62D 15/028
(Continued)

OTHER PUBLICATIONS

R. Prophet, M. Hoffmann, M. Vossiek, Gang Li and C. Sturm, "Parking space detection from a radar based target list," 2017 IEEE MTT-S International Conference on Microwaves for Intelligent Mobility (ICMIM), Nagoya, Japan, 2017, pp. 91-94, (Year: 2017).*
(Continued)

*Primary Examiner* — Jelani A Smith
*Assistant Examiner* — Jacob Daniel Underbakke
(74) *Attorney, Agent, or Firm* — Xianghui Huang; Frank D. Cimino

(57) ABSTRACT

Examples provide for computer executable instructions executable by a processor to configure the processor to determine an occupancy status of cells of a region of interest by, for a first cell of the region of interest, determining whether the first cell is free by setting a free space flag for the first cell to an asserted value and setting a free space tested flag for the first cell to an asserted value responsive to determining that the first cell and each of the surrounding cells in the programmed radius of the first cell are unoccu-
(Continued)

pied, and setting a free space flag for a second cell to a de-asserted value and setting a free space tested flag for the second cell to an asserted value responsive to determining that the second cell is occupied, the second cell being among the surrounding cells in the programmed radius of the first cell.

16 Claims, 6 Drawing Sheets

(56) References Cited

U.S. PATENT DOCUMENTS

| | | | | |
|---|---|---|---|---|
| 2016/0049078 | A1* | 2/2016 | Neff | G08G 1/16 |
| | | | | 701/301 |
| 2017/0316253 | A1* | 11/2017 | Phillips | G06V 20/647 |
| 2018/0281680 | A1* | 10/2018 | Gerardo Castro | G06N 7/01 |
| 2018/0300561 | A1* | 10/2018 | Steyer | G06V 20/58 |
| 2018/0300564 | A1* | 10/2018 | Kwant | G06V 10/50 |
| 2018/0373248 | A1* | 12/2018 | Chornenky | G06F 7/76 |
| 2019/0384303 | A1* | 12/2019 | Muller | G06N 20/00 |
| 2020/0182626 | A1* | 6/2020 | He | G06T 7/11 |
| 2020/0202107 | A1* | 6/2020 | Ozkucur | G06F 18/22 |
| 2021/0004012 | A1* | 1/2021 | Marchetti-Bowick | |
| | | | | G05D 1/0221 |
| 2021/0308862 | A1* | 10/2021 | Lin | B25J 9/1666 |
| 2021/0394761 | A1* | 12/2021 | Steyer | G06V 20/58 |
| 2022/0046114 | A1* | 2/2022 | Entelis | H04L 67/5651 |
| 2022/0185267 | A1* | 6/2022 | Beller | B60W 30/0956 |
| 2022/0185294 | A1* | 6/2022 | Rakotovao Andriamahefa | |
| | | | | G05D 1/0274 |
| 2022/0203967 | A1* | 6/2022 | Park | B60W 30/06 |
| 2022/0404829 | A1* | 12/2022 | Nister | G05D 1/0212 |
| 2023/0169721 | A1* | 6/2023 | Gautron | G06T 15/506 |
| | | | | 345/426 |

FOREIGN PATENT DOCUMENTS

| | | | | | |
|---|---|---|---|---|---|
| DE | 102017216442 | A1 | * | 3/2019 | |
| DE | 102020134331 | A1 | * | 6/2022 | G06V 10/44 |
| EP | 3289578 | B1 | * | 3/2019 | G01S 7/4808 |
| KE | 20180094055 | A | * | 8/2018 | |
| WO | WO-2018170472 | A1 | * | 9/2018 | G06V 10/82 |
| WO | WO-2021074660 | A1 | * | 4/2021 | G01S 17/931 |

OTHER PUBLICATIONS

U. Lee, S. Yoon, H. Shim, p. Vasseur and C. Demonceaux, "Local path planning in a complex environment for self-driving car," The 4th Annual IEEE International Conference on Cyber Technology in Automation, Control and Intelligent, Hong Kong, China, 2014, pp. 445-450 (Year: 2014).*

Texas Instruments, "PTK Free and Park-able Free Space Detection", Perception Tool Kit (PTK) API Guide, found at: http://software-dl.ti.com/jacinto7/esd/processor-sdk-rtos-jacinto7/latest/exports/docs/perception/docs/ptk_api_guide/group_group_ptk_algos_fsdpfsd.html, Nov. 30, 2021.

* cited by examiner

FREE SPACE DETECTION AND PARK-ABLE FREE SPACE DETECTION FOR OCCUPANCY GRIDS USING SENSOR MEASUREMENTS

BACKGROUND

Autonomous driving, or the ability of a vehicle to navigate spaces on its own without receiving positive control inputs from a user to cause the navigation, includes multiple aspects. One of these aspects is the ability for an autonomously driven vehicle to park itself in an available, or free, parking space.

SUMMARY

In some examples, a computer program product comprises computer executable instructions, the instructions executable by a processor. Executing the instructions causes the processor to be configured to determine an occupancy status of cells of a region of interest by, for a first cell of the region of interest, determining whether the first cell is free by setting a free space flag for the first cell to an asserted value and setting a free space tested flag for the first cell to an asserted value responsive to determining that the first cell and each of the surrounding cells in the programmed radius of the first cell are unoccupied, and setting a free space flag for a second cell to a de-asserted value and setting a free space tested flag for the second cell to an asserted value responsive to determining that the second cell is occupied, the second cell being among the surrounding cells in the programmed radius of the first cell.

In some examples, an apparatus, includes a controller configured to determine an occupancy status of cells of a region of interest by, for a first cell of the region of interest, determining whether the first cell is free by setting a free space flag for the first cell to an asserted value and setting a free space tested flag for the first cell to an asserted value responsive to determining that the first cell and each of the surrounding cells in the programmed radius of the first cell are unoccupied, and setting a free space flag for a second cell to a de-asserted value and setting a free space tested flag for the second cell to an asserted value responsive to determining that the second cell is occupied, the second cell being among the surrounding cells in the programmed radius of the first cell.

DETAILED DESCRIPTION

Free space in which an autonomous vehicle may park itself may be identified based on a Binarized Occupancy Grid (B-OG) map created based on the input of one or multiple sensors. A B-OG includes a number of two-dimensional (2D) grid cells arranged to cover a mapped area. Each grid cell may be assigned a value to indicate whether or not the grid cell is determined to correspond to occupied space. Each grid cell may have a bit map, where each bit of the bit map for a grid cell corresponds to a state of the grid cell, such as occupied, free, tested, parkable, etc. For example, if a grid cell is determined to correspond to occupied space, an occupied flag, or bit, of that grid cell is set to a logical 1 value. Similarly, if a grid cell is determined to correspond to free space, the occupied flag, or bit, of that grid cell is set to a logical 0 value. In another example, if a grid cell is determined to correspond to free space, a free flag, or bit, of that grid cell is set to a logical 1 value.

The grid cell values may be determined according to various sensor inputs and processing of those sensor inputs. The processing can include free space detection (FSD). FSD iterates through all grid cells in a region of interest (ROI) and identifies grid cells that are free according to a programmed criteria. An example of the programmed criteria is that a grid cell under test is determined to correspond to free space if all grid cells within a radius r of the grid cell under test are also determined to correspond to free space. As used herein, all grid cells within a radius r of the grid cell under test includes all whole cells within a circle centered on the grid cell under test and having the radius r. Generally, the processes of identifying grid cells in a ROI and determining whether the grid cells in the ROI correspond to free space are computationally expensive, consuming a comparatively large amount of processing time and power compared to a majority of other processing operations.

Aspects of this description provide for determining parkable free space for an autonomous vehicle. The parkable free space may be determined by identifying grid cells in a region of interest and, for each of those identified grid cells, determining whether the grid cell corresponds to occupied or free space. In at least some examples, computational improvements may be obtained over other FSD approaches by identifying a grid cell (e.g., previously tested in a FSD operation or process) as having been tested responsive to determining that the grid cell is occupied. The identification as having been tested may be made without testing the grid cell. Identifying the grid cell as having been tested may allow the grid cell to be skipped in the FSD operation, providing increases in computational efficiency and speed, and a reduction in computational power consumed and time spent.

Figure 1:
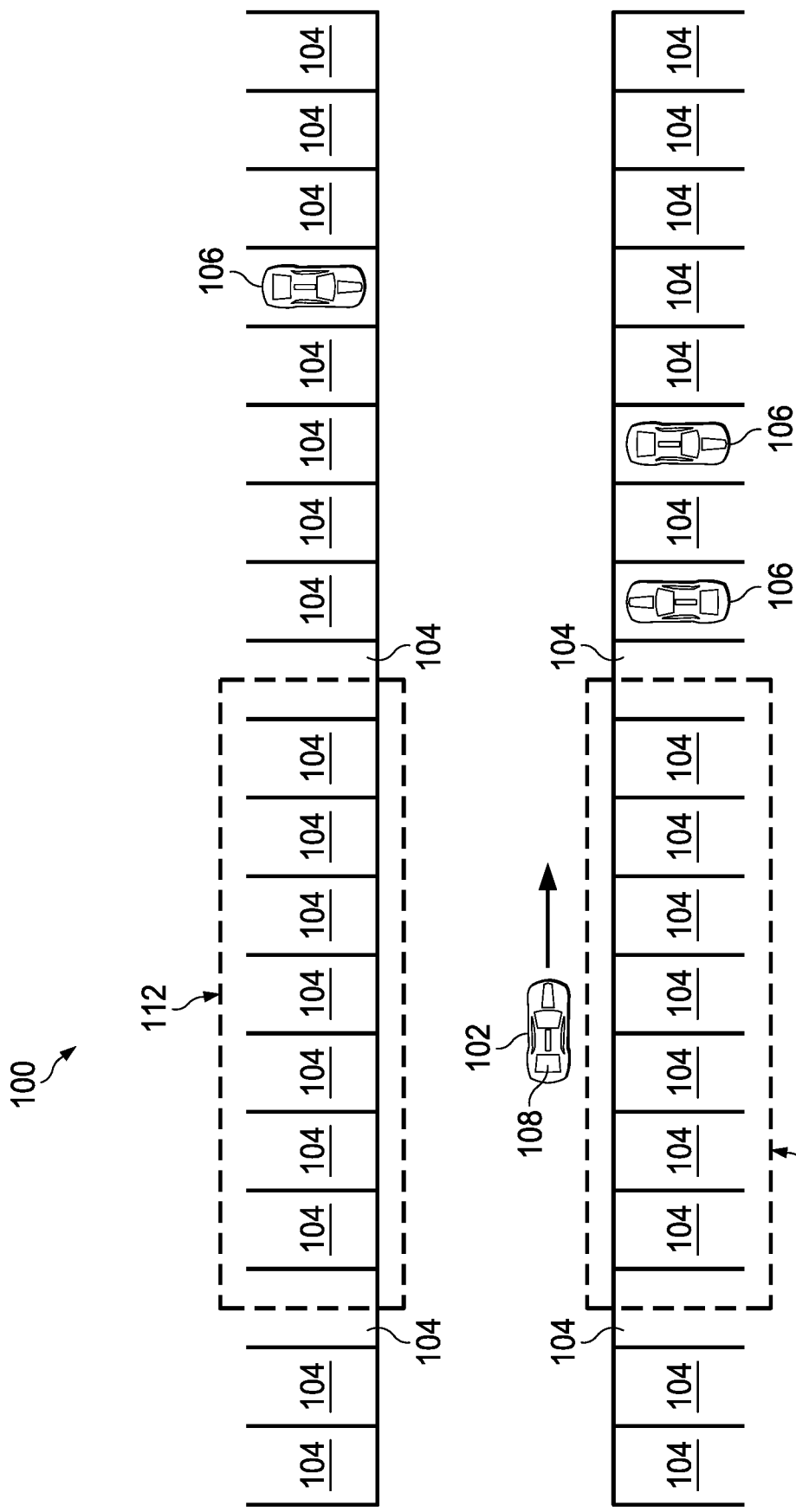
FIG. 1 is a diagram of an implementation environment for free space detection (FSD), in accordance with various examples.

FIG. 1 is a diagram of an implementation environment 100 for FSD, in accordance with various examples. In at least some examples, the environment 100 is representative of a parking lot in which a vehicle 102 may travel. The parking lot may include a number of parking spaces 104. In some examples, the parking spaces 104 are similarly sized. In other examples, at least some of the parking spaces 104 have different sizes than other of the parking spaces 104. Some of the parking spaces 104 may be of a suitable size for accommodating parking of the vehicle 102 while other of the parking spaces 104 may be too small to accommodate parking of the vehicle 102, may be of suitable size for accommodating parking of the vehicle 102 but may be occupied by another vehicle 106, or may be of suitable size for accommodating parking of the vehicle 102 but may be obstructed by some obstruction (not shown).

In some examples, the vehicle 102 includes a parking free space detection (PFSD) system 108 that determines which of the parking spaces 104 are free for parking of the vehicle 102, such as by being of a sufficient size and not being obstructed by an obstruction or another vehicle 106. The PFSD system 108 determines a ROI 110 encompassing at least a portion of the parking spaces 104. In some examples, the PFSD system 108 may also determine a ROI 112 encompassing at least another portion of the parking spaces 104. The PFSD system 108 may create a B-OG for the ROI 110, the ROI 112, or a combination thereof. The B-OG includes cells, as described above, that respectively indicate whether the cells are occupied or unoccupied based on sensor input. The sensor input may be received from sensors (not shown) of the vehicle 102, such as a camera, a radar sensor, a lidar sensor, etc.

Based on the B-OG, the PFSD system 108 may identify free space in the ROI 110, the ROI 112, or a combination thereof. For example, the PFSD system 108 may identify the free space according to a FSD process. In some examples, the FSD process identifies cells of the B-OG that are deemed free space according to programmed criteria. For example, a cell that is determined to be unoccupied may not be deemed free. Instead, in some examples, a cell under test may be deemed free if the cell under test and all cells within a radius r of the cell under test are also unoccupied. The cell under test is a cell of the B-OG for which the PFSD system 108 is performing processing to determine whether the cell is free or is not free. In other examples, the cell under test may be deemed free if the cell under test and all cells within a programmed distance of the cell under test are unoccupied.

In determining whether a cell under test is free, the PFSD system 108 determines whether at least some cells adjacent to the cell under test are occupied. Such determination may be made prior to determining whether those adjacent cells are themselves free. While determining whether a cell under test is free, responsive to determining that an adjacent cell that is occupied is located too close to the cell under test for the cell under test to be deemed free, the adjacent cell is identified as having been tested for free space. For example, a free space tested flag, or data bit, is set to a logical 1 value for the adjacent cell. The adjacent cell may be identified as having been tested for free space despite such testing not having been performed by the PFSD system 108. For example, because the PFSD system 108 knows from determining whether the cell under test is free that the adjacent cell is occupied, the PFSD system 108 also knows that the adjacent cell by definition cannot be free.

In the FSD process, the PFSD system 108 may iterate through each cell of the B-OG until respective free space tested flags of each cell of the B-OG are set to a logical 1 value. However, resulting from at least some cells of the B-OG being marked as having been tested without the respective cells having been tested, computational improvements may be gained over other FSD processes in which every cell of the B-OG is processed to determine whether the respective cells are free. For example, responsive to the PFSD system 108 encountering a cell during its iterative processing of the B-OG that has a free space tested flag set to a logical 1 value, the PFSD system 108 may skip processing of that cell to determine whether that cell is free and instead move to a next cell in the iterative processing of the B-OG. In at least some examples, such skipping of the cell that has a free space tested flag set to a logical 1 value may achieve computational improvements may be gained over other FSD processes in which every cell of the B-OG is processed to determine whether the respective cells are free.

After determining whether a cell is or is not free, the PFSD system 108 may perform a PFSD process. The PFSD process may determine whether a number of contiguous free cells of the B-OG in one or two dimensions is equal to or greater than a programmed value. For example, programmed values for the vehicle 102 may be provided. The programmed values may indicate a number of cells of the B-OG in each of a vertical and horizontal direction that must be free for the PFSD system 108 to determine that sufficient space exists for the vehicle 102 to be parked (e.g., parkable free space). In some examples, the programmed values may be in terms of a number of cells of the B-OG. In other examples, the programmed values may be in units of measure, such as meters, feet, or the like and the PFSD system 108 may convert the programmed values in units of measure to instead be in terms of a number of cells of the B-OG.

In at least some examples, the PFSD system 108 may align the ROI 110, the ROI 112, or a combination thereof to the parking spaces 104. For example, the PFSD system 108 may align the ROI 110, the ROI 112, or a combination thereof to the parking spaces 104 such that two sides of the aligned ROI remain parallel to a direction of travel of the vehicle 102 (and a side of the vehicle 102 itself) as the vehicle 102 travels adjacent to the parking spaces 104. Further, in some examples, the PFSD system 108 may limit times at which the FSD process and the PFSD process are performed. For example, the PFSD system 108 may perform the FSD and PFSD processes responsive to the B-OG being updated based on all sensor data available to the vehicle 102 and useful in providing the B-OG, responsive to the vehicle 102 moving an amount greater than a threshold amount of movement (e.g., translation or rotation), a change in status or value or a flag, marker, or other data unit associated with a number of cells, or any other suitable criteria.

Figure 2:
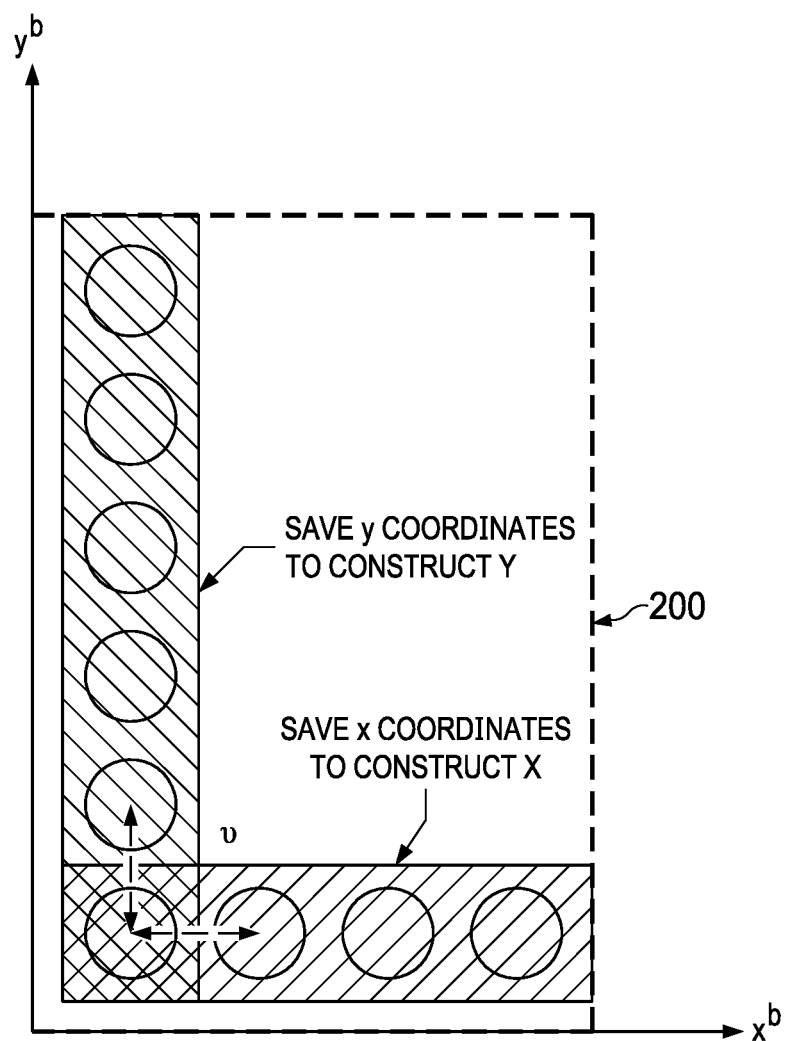
FIG. 2 is a diagram of a region of interest (ROI), in accordance with various examples.

FIG. 2 is a diagram of a ROI 200, in accordance with various examples. In at least some examples, the ROI 200 is determined by the PFSD system 108, as described above with respect to FIG. 1. Accordingly, reference may be made to aspects of FIG. 1 in describing FIG. 2. In at least some examples, the ROI 200 is defined by coordinates along an x axis (e.g., a horizontal axis) and a y axis (e.g., a vertical axis). In at least some examples, the set of x and y coordinates are defined as X and Y such that $X=\{(iv: i \in Z^+, v>0\}$, and $Y=\{(jv: j \in Z^+, v>0\}$, where, $Z^+$ is the set of positive integers including zero, $v=\min(x_{cell}, y_{cell})/\sqrt{2}$, and $x_{cell}$ and $y_{cell}$ are respective cell sizes in x and y. In at least some examples, X and Y are stored by the PFSD system 108 during an initialization phase or operation that is performed prior to the PFSD system 108 receiving sensor data (e.g., measurement data).

Figure 3:
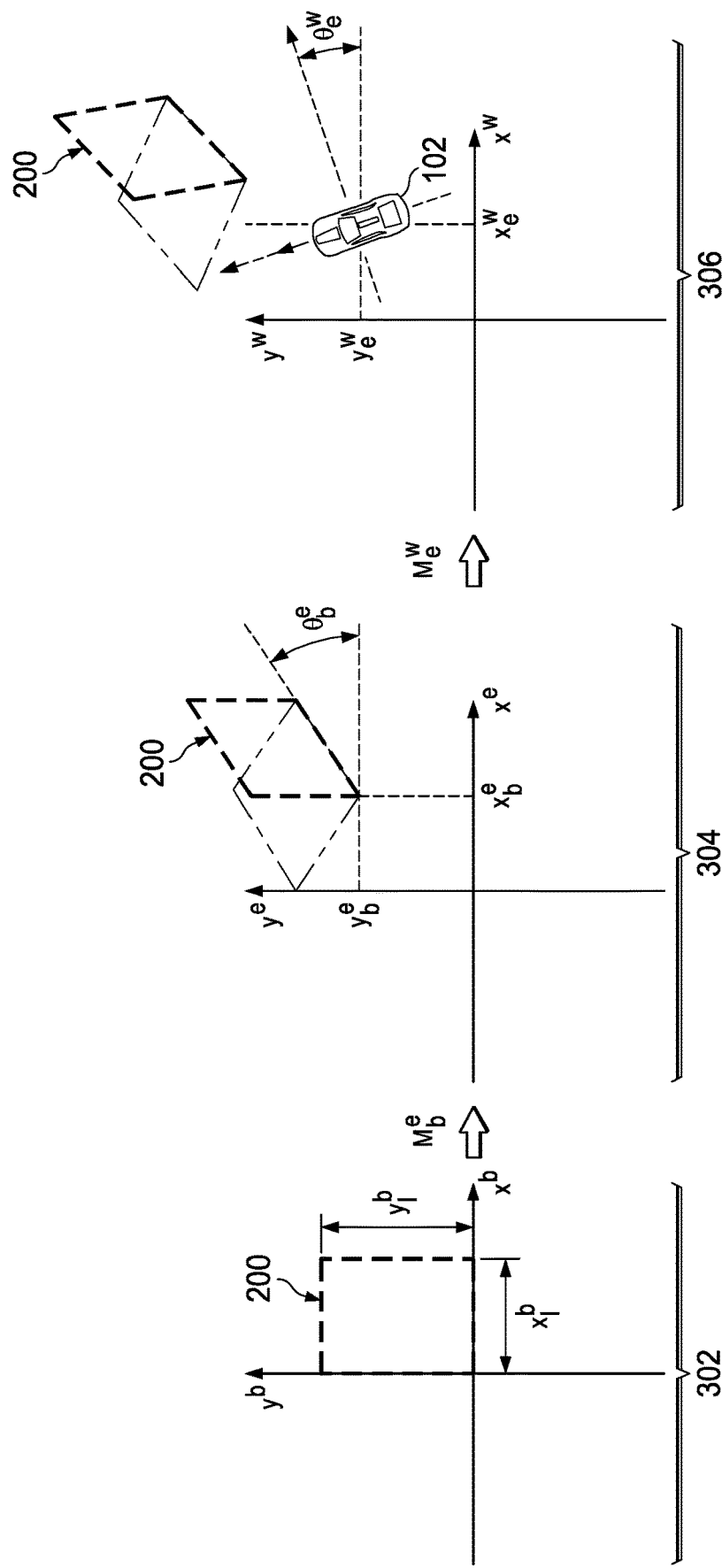
FIG. 3 is a diagram of ROI coordinate transformation, in accordance with various examples.

FIG. 3 is a diagram of ROI coordinate transformation, in accordance with various examples. In at least some examples, reference may be made to aspects of any of the foregoing figures in describing FIG. 3. As shown by graph 302, the ROI 200 may initially be defined according to box (b) coordinates in which $x_l^b$ is a length (l) of the ROI 200 in an x axis direction, and $y_l^b$ is a length (e.g., heights) of the ROI 200 in a y axis direction. In at least some examples, the ROI 200 may be transformed according to a transformation $M_b^e$ and defined according to ego-car (e) coordinates (e.g., in a coordinate system centered on the vehicle 102), as shown by the graph 304. In at least some examples, $M_b^e$ includes a translation $x_b^e$ in the x axis direction, a translation $y_b^e$ in the y-axis direction, and a rotation $\theta_b^e$.

In at least some examples, $M_b^e$ causes the ROI 200 to be oriented in a manner aligned with markings of the parking spaces 104 and parallel to a direction of travel of the vehicle 102. For example, the PFSD system 108 may detect, identify, or otherwise determine the orientation, positioning, or direction of markings that define at least some of the parking spaces 104. In some examples, the markings are substantially perpendicular to the direction of travel of the vehicle 102 (e.g., for "straight" parking spaces). In other examples, the markings are arranged obliquely to the direction of travel of the vehicle 102 (e.g., for "angled" parking spaces). In at least some examples, based on the markings of the parking spaces 104, the PFSD system 108 determines $M_b^e$. In at least some examples, the ROI 200 may be transformed according to a transformation $M_e^w$ and defined according to world (w) coordinates, as shown by the graph 304. In at least some examples, $M_e^w$ includes a translation $x_e^w$ in the x axis direction, a translation ye in the y-axis direction, and a rotation $\theta_e^w$. Subsequent to transforming the ROI 200 to world coordinates, in at least some examples then PFSD system 108 may execute the FSD process, as described above, for the ROI 200. The box coordinates specify the ROI 200 as a fixed rectangular box, lacking position information with respect to the vehicle 102 or a point of origin of a map that includes the ROI 200. The ego coordinates specify the ROI 200 with respect to the vehicle 102. The world coordinates specify the ROI 200 with respect to a point of origin of the map that includes the ROI 200.

Figure 4:
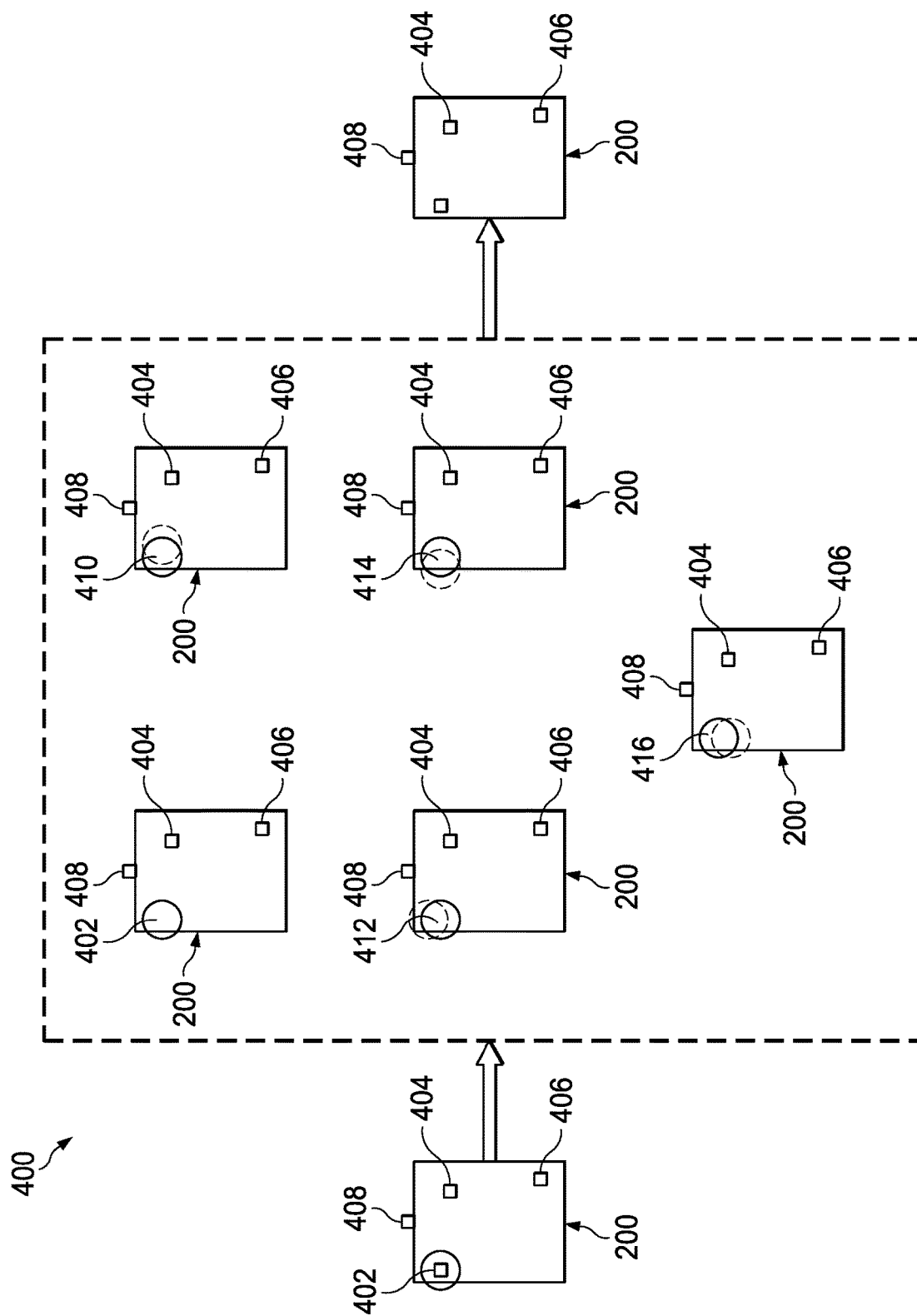
FIG. 4 is a diagram of a FSD process, in accordance with various examples.

FIG. 4 is a diagram 400 of a FSD process, in accordance with various examples. In at least some examples, reference may be made to aspects of any of the foregoing figures in describing FIG. 4. The diagram 400 is representative of processing by the PFSD system 108 for a cell 402 of the ROI 200. In at least some examples, occupied cells 404, 406, and 408 may exist in, or adjacent to, the ROI 200. All cells other than cells 404, 406, and 408 may be determined to be unoccupied in the ROI 200 as shown in FIG. 4.

As described above, in some examples, for the cell 402 to be deemed free, no occupied cells (e.g., the cells 404, 406 and/or 408) may be located within a radius r of the cell 402. The PFSD system 108 may analyze the cell 402 and cells 410, 412, 414, 416 of the ROI 200 immediately adjacent to an edge of the cell 402 to determine whether the analyzed cells are free. Responsive to determining that the analyzed cells are free, the PFSD system 108 sets a free space flag of the cell 402 to a logical 1 value and sets a free space tested flag of the cell 402 to a logical 1 value.

Figure 5:
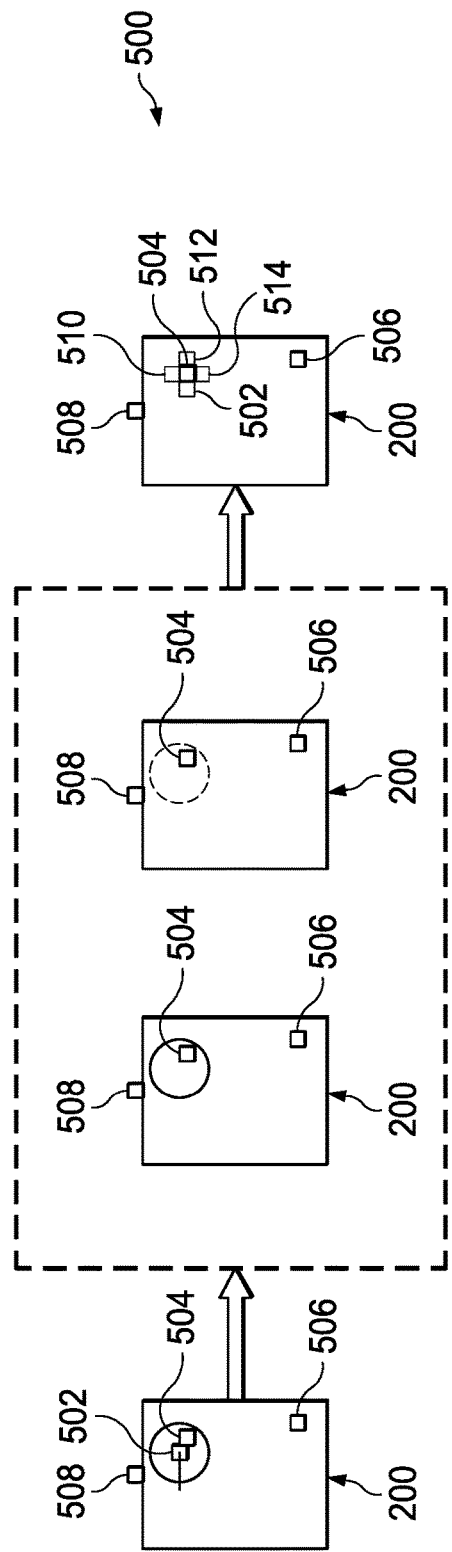
FIG. 5 is a diagram of a FSD process, in accordance with various examples.

FIG. 5 is a diagram 500 of a FSD process, in accordance with various examples. In at least some examples, reference may be made to aspects of any of the foregoing figures in describing FIG. 5. The diagram 500 is representative of processing by the PFSD system 108 for a cell 502 of the ROI 200. In at least some examples, occupied cells 504, 506, and 508 may exist in, or adjacent to, the ROI 200. All cells other than cells 504, 506, and 508 may be determined to be unoccupied in the ROI 200 as shown in FIG. 5.

As described above, in some examples, for the cell 502 to be deemed free, no occupied cells (e.g., the cells 504, 506 and/or 508) may be located within a radius r of the cell 504. The PFSD system 108 may analyze the cell 502 and cell 504 of the ROI 200 to determine whether the analyzed cells are free. In at least some examples, because the cell 504, a cell immediately adjacent to the cell 502 is occupied, the cell 502 is deemed to not be free. Responsive to determining that the cell 502 is not free, the PFSD system 108 maintains a free space flag of the cell 502 as having a logical 0 value and sets a free space tested flag of the cell 502 to a logical 1 value. Also responsive to determining that the cell 504 is occupied, the PFSD system 108 sets a free space flag of the cell 504 to a logical 0 value and sets a free space tested flag of the cell 504 to a logical 1 value. In at least some examples, setting the free space tested flag of the cell 504 to a logical 1 value may facilitate the PFSD system 108 skipping processing of the cell 504 in a subsequent iteration of a FSD process for the ROI 200, saving computational resources and time that otherwise would have been spent by processing the cell 504 to determine whether the cell 504 is free, despite already knowing that the cell 504 is occupied.

In some examples, the cells 510, 512, and 514 are cells immediately adjacent to an edge of the cell 504 in the ROI 200. The PFSD system 108 may also set respective free space tested flags of the cells 510, 512, and 514 to logical 1 values and respective free space flags of the cells 510, 512, 514, and 516 to logical 0 values. For example, resulting from the cell 504 being occupied, the PFSD system 108 may know by definition that the cells 510, 512, and 514 cannot be deemed free because the cell 504 is within the radius r of the cells 510, 512, and 514. Therefore, computational resources and time that otherwise would have been spent by processing the cells 510, 512, and 514 to determine whether the cells 510, 512, and 514, respectively, are free, may be saved resulting from the PFSD system 108 having knowledge that, by definition, none of the cells 510, 512, and 514 may be deemed free as a result of the cell 504 being occupied.

In at least some examples, the PFSD system 108 may implement the FSD process by first clearing (e.g., setting to a logical 0 value) the free space flag and the free space tested flag for all cells in the ROI 200. The PFSD system 108 may next iterate through each cell of the ROI 200 to determine whether a cell under test of the ROI 200 (e.g., the cell 402 in FIG. 4 and the cell 502 in FIG. 5) is free. For example, for a cell under test having coordinates (i, j), if the free space tested flag for the cell under test has a value of logical 0, the PFSD system 108 iterates through a circle surrounding the cell under test. For example, the PFSD system 108 iterates through cells (i+m, j+n) for $\forall m, n \in Z$ and $(m*x_{cell})^2 + (n*y_{cell})^2 < r^2$. If the PFSD system 108 determines that cell (i+m,j+n) is occupied, the PFSD system 108 clears the free space flag for cells (i+m, j+n) and (i, j), sets the free space tested flag for cells (i+m,j+n) and (i, j), and moves to a next coordinate in the ROI 200. In at least some examples, the PFSD system 108 may also set the free space test flag for cells (m+o, n+p) for $\forall o, p \in Z$ and $(o*x_{cell})^2 + (p*y_{cell})^2 < r^2$ to achieve various computational improvements, as described above. If the PFSD system 108 determines that none of the cells iterated through and analyzed for determining whether the cell (i, j) is free, the PFSD system 108 clears the free space flag for cell (i, j), sets the free space tested flag for cell (i, j), and moves to a next coordinate in the ROI 200 until no cells remain in the ROI 200 for which their free space tested flag does not have a value of logical 1.

Figure 6:
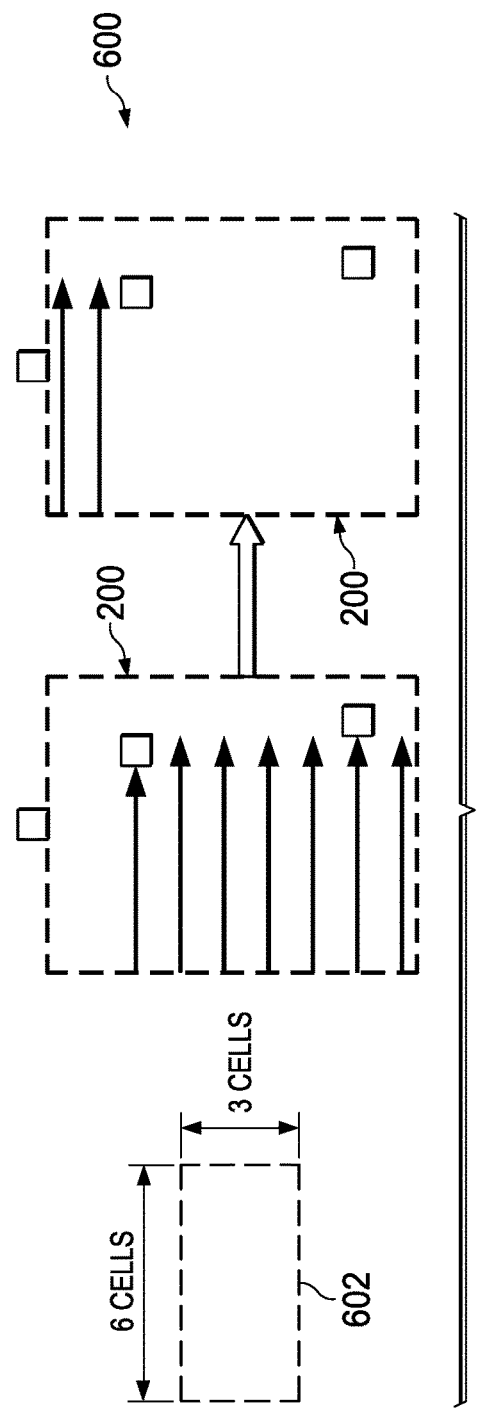
FIG. 6 is a diagram of a parking free space detection (PFSD) process, in accordance with various examples.

FIG. 6 is a diagram 600 of a PFSD process, in accordance with various examples. In at least some examples, reference may be made to aspects of any of the foregoing figures in describing FIG. 6. In at least some examples, a second ROI 602 may be programmed. As shown in FIG. 6, the second ROI 602 has a width of 6 cells and a height of 3 cells. The second ROI 602 may, in some examples, be a size of the vehicle 102, or a size of the vehicle 102 plus an offset or other increase in size (e.g., such as to facilitate turning of the vehicle 102). The second ROI 602 has a size that is equal to, or less than, the size of the ROI in both x and y dimensions. As shown in FIG. 6, the ROI 200 has a width of 9 cells and a height of 9 cells. After determining which of the cells of the ROI 200 are free, the PFSD system 108 may determine whether a contiguous number of the cells that have been determined to be free within the ROI 200 exist to fully encompass the second ROI 600. For example, the PFSD system 108 may perform a PFSD process to determine whether a sufficient number of cells determined in the ROI 200 to be free are contiguous so as to facilitate parking of the vehicle 102 in the ROI 200, where the second ROI 600 is a subset of the ROI 200. As shown in FIG. 6, the PFSD system 108 may determine that a contiguous area defined by a width of 6 cells and a height of 6 cells is free, encompassing the size of the second ROI 600 and facilitating parking of the vehicle 102 in a subset of the cells of the ROI 200 that are within the 6 cell by 6 cell contiguous area.

In at least some examples, the PFSD system 108 may compute a number of cells of the ROI 200, in both the x and y directions, $c_{x;pfsd}$ and $c_{y;pfsd}$, that constitute sufficient space for the second ROI 600. Assuming in an example that the size of cells of the ROI 200 in the x and y directions is 0.1 meters (m), the size of the ROI 200 is 5 m×7 m, and the size of the second ROI 602 is 2 m×4 m. In such an example, the x coordinates are $$X = \left\{0, \frac{0.1}{\sqrt{2}}, \frac{0.2}{\sqrt{2}}, \ldots \underline{5}\right\},$$

and the y coordinates are $$Y = \left\{0, \frac{0.1}{\sqrt{2}}, \frac{0.2}{\sqrt{2}}, \ldots \underline{7}\right\},$$

where $\underline{7}$ and $\underline{5}$ correspond to the numbers just under 7 and 5, respectively, in the sequence, as well as to the size of the ROI 200. Thus, a count of the number of cells of the ROI 200 in the x and y directions that corresponds to the second ROI 602 is $$c_{x;pfsd} = \left|\left\{0, \frac{0.1}{\sqrt{2}}, \frac{0.2}{\sqrt{2}}, \ldots \underline{2}\right\}\right| \text{ and } c_{y;pfsd} = \left|\left\{0, \frac{0.1}{\sqrt{2}}, \frac{0.2}{\sqrt{2}}, \ldots \underline{4}\right\}\right|,$$

respectively, where |·| corresponds to the size of the set, and where $\underline{4}$ and $\underline{2}$ correspond to the numbers just under 4 and 2, respectively, in the sequence, as well as to the size of the second ROI 602. Subsequently, during runtime of the PFSD system 108, after performing the FSD process, the PFSD system 108 may determine whether parkable space exists for the vehicle 102 by counting the consecutive number of free cells of the ROI 200 and determining whether that number in the x and y directions is equal to or greater than the dimensions of the ROI 602 in the x and y directions.

Figure 7:
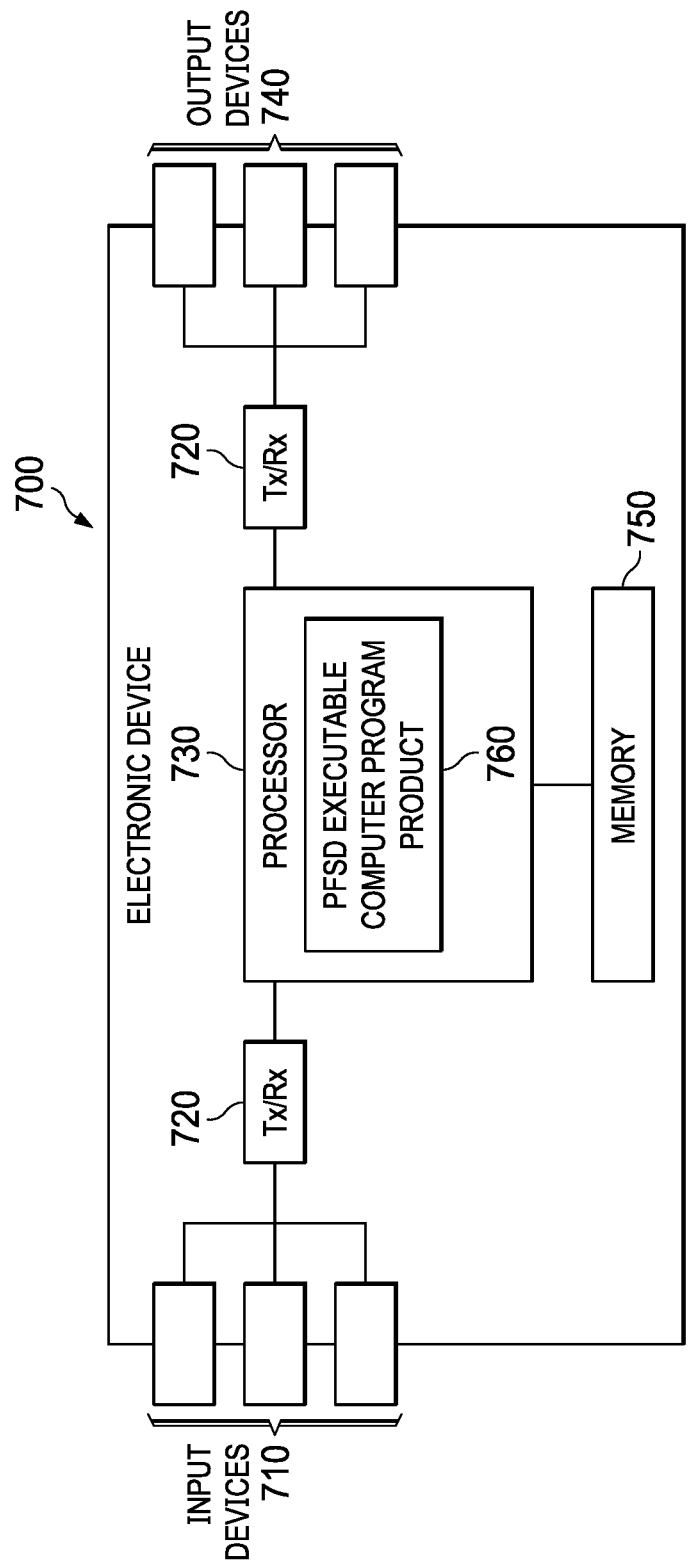
FIG. 7 is a block diagram of an electronic device, in accordance with various examples.

FIG. 7 is a block diagram of an electronic device 700, in accordance with various examples. In at least some examples, reference may be made to aspects of any of the foregoing figures in describing FIG. 7. Electronic device 700 may be any suitable computing or processing device capable of performing the functions disclosed herein. In at least some examples, electronic device is, or is a component of, an automobile or other vehicle. Electronic device 700 implements at least some of the features/methods disclosed herein, including at least actions attributed to the PFSD system 108. Accordingly, in at least some examples, the electronic device is, includes, or couples to the PFSD system 108.

The electronic device 700 comprises input devices 710. Some of the input devices 710 may be sensors which provide input to the electronic device 700, such as cameras, radar, lidar, etc. Some other of the input devices 710 may be downstream ports coupled to a transceiver (Tx/Rx) 720, which are transmitters, receivers, or combinations thereof. The Tx/Rx 720 transmits and/or receives data to and/or from other computing devices via at least some of the input devices 710. Similarly, the electronic device 700 comprises a plurality of output devices 740. At least some of the output devices 740 may be upstream ports coupled to another Tx/Rx 720, wherein the Tx/Rx 720 transmits and/or receives data from other nodes via the upstream ports. The downstream ports and/or the upstream ports may include electrical and/or optical transmitting and/or receiving components. In another example, the electronic device 700 comprises antennas (not shown) coupled to the Tx/Rx 720. The Tx/Rx 720 transmits and/or receives data from other computing or storage devices wirelessly via the antennas. In yet other examples, the electronic device 700 may include additional Tx/Rx 720 such that the electronic device 700 has multiple networking or communication interfaces, for example, such that the electronic device 700 may communicate with a first device using a first communication interface and may communicate with a second device using a second communication interface.

A processor 730 is coupled to the Tx/Rx 720 and at least some of the input devices 710 and/or output devices 740 and implements the processes described herein, such as via a PFSD executable computer program product 760. In an example, the processor 730 comprises multi-core processors and/or memory modules 750, which functions as data stores, buffers, etc. The processor 730 is implemented as a general processor or as part of application specific integrated circuits (ASICs), field-programmable gate arrays (FPGAs), and/or digital signal processors (DSPs). Although illustrated as a single processor, the processor 730 is not so limited and may comprises multiple processors. In at least some examples, the processor 730 may be, or may be referred to as, a CPU. In at least some examples, the processor 730 may be a controller, or an embedded controller. In at least some examples, the processor 730 implements instructions of the PFSD executable computer program product 760 to perform functions attributed herein to the PFSD system 108.

FIG. 7 also shows that a memory module 750 is coupled to the processor 730 and is a non-transitory medium to store various types of data. Memory module 750 comprises memory devices including secondary storage, read-only memory (ROM), and random-access memory (RAM). The secondary storage may comprise of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that may have a small memory capacity relative to the larger memory capacity of the secondary storage. The RAM is used to store volatile data and perhaps to store instructions. Access to both the ROM and RAM may be faster than to the secondary storage.

The memory module 750 may be used to house the instructions for carrying out the various examples described herein. For example, the memory module 750 may comprise the PFSD executable computer program product 760, which is executed by processor 730.

It is understood that by programming and/or loading executable instructions onto the electronic device 700, at least one of the processor 730 and/or the memory module 750 are changed, transforming the electronic device 700 in part into a particular machine or apparatus, for example, a dock health monitoring device having the novel functionality taught by the present disclosure, such as a PFSD system (e.g., the PFSD system 108).

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Unless otherwise stated, "about," "approximately," or "substantially" preceding a value means+/−10 percent of the stated value. Modifications are possible in the described examples, and other examples are possible within the scope of the claims.

What is claimed is:

1. A non-transitory computer program product comprising computer executable instructions, the instructions executable by a processor to cause the processor to be configured to:
   in a Binarized Occupancy Grid (B-OG) map, wherein the B-OG map includes a first cell and a second cell within a region of interest, write to the first cell and the second cell by:
      setting the first cell as a cell under test;
      setting a free space flag for the first cell to a de-asserted value responsive to determining that the first cell is occupied based on sensor data;
      setting a free space tested flag for the first cell to an asserted value responsive to determining that the first cell is occupied;
      setting a free space flag for the second cell to a de-asserted value responsive to determining that the second cell is occupied based on the sensor data, the second cell being among a set of surrounding cells in a programmed radius of the first cell;
      setting a free space tested flag for the second cell to the asserted value responsive to determining that the second cell is occupied;
      for the second cell of the region of interest, responsive to the free space tested flag for the second cell having the de-asserted value, setting free space tested flags of a plurality of other cells adjacent to the second cell to the asserted value and setting free space flags of the plurality of other cells adjacent to the second cell to the de-asserted value;
      responsive to setting the free space tested flags of the plurality of other cells adjacent to the second cell to the asserted value, skipping setting the second cell as the cell under test; and
      setting a free space flag of a third cell in the region of interest to the asserted value based on the sensor data;
   determine, based on the free space flag of the third cell and a dimension of a vehicle, whether sufficient contiguous unoccupied space exists in the region of interest to accommodate the vehicle; and
   control the vehicle to park in the region of interest and control the vehicle to park in the region of interest.

2. The non-transitory computer program product of claim 1, wherein occupancy of the first cell of the region of interest is determined by performing machine-vision processing of pixels of a computer-generated image of the region of interest.

3. The non-transitory computer program product of claim 1, wherein the set of surrounding cells are cells which share a side with the first cell.

4. The non-transitory computer program product of claim 1, wherein the region of interest has first and second sides parallel to markings in the region of interest and third and fourth sides determined to be parallel to a direction of travel of the vehicle traveling adjacent to the region of interest.

5. The non-transitory computer program product of claim 4, wherein the markings delineate parking spaces.

6. The non-transitory computer program product of claim 5, wherein the processor is configured to detect the markings and apply a transformation to the region of interest based on the markings.

7. An apparatus, comprising:
   a controller configured to:
      determine an occupancy status of a first cell and a second cell of a region of interest in a Binarized Occupancy Grid (B-OG) map by:
      setting the first cell as a cell under test;
      setting a free space flag for the first cell to a de-asserted value responsive to determining that the first cell is occupied based on sensor data;
      setting a free space tested flag for the first cell to an asserted value responsive to determining that the first cell is occupied;
      setting a free space flag for the second cell to a de-asserted value responsive to determining that the second cell is occupied based on the sensor data, the second cell being among a set of surrounding cells in a programmed radius of the first cell;
      setting a free space tested flag for the second cell to the asserted value responsive to determining that the second cell is occupied;
      for the second cell of the region of interest, responsive to the free space tested flag for the second cell having the de-asserted value, setting free space tested flags of a plurality of other cells adjacent to the second cell to the asserted value and setting free space flags of the plurality of other cells adjacent to the second cell to the de-asserted value;

responsive to setting the free space tested flags of the plurality of other cells adjacent to the second cell to the asserted value, skipping setting the second cell as the cell under test; and setting a free space flag of a third cell in the region of interest to the asserted value based on the sensor data:

determine, based on the free space flag of the third cell and a dimension of a vehicle, whether sufficient contiguous unoccupied space exists in the region of interest to accommodate the vehicle; and control the vehicle to park in the region of interest and control the vehicle to park in the region of interest.

8. The apparatus of claim 7, wherein the set of surrounding cells are cells which share a side with the first cell.

9. The apparatus of claim 7, wherein the region of interest has first and second sides parallel to markings in the region of interest and third and fourth sides determined to be parallel to a direction of travel of the vehicle traveling adjacent to the region of interest.

10. The apparatus of claim 9, wherein the markings delineate parking spaces and the controller is configured to detect the markings and apply a transformation to the region of interest based on the markings.

11. A method comprising:

acquiring sensor data for a first cell and a second cell in a Binarized Occupancy Grid (B-OG) map, wherein the B-OG map includes the first cell and the second cell within a region of interest;

setting the first cell as a cell under test;

setting a free space flag for the first cell to a de-asserted value responsive to determining that the first cell is occupied based on the sensor data;

setting a free space tested flag for the first cell to an asserted value responsive to determining that the first cell is occupied;

setting a free space flag for the second cell to a de-asserted value responsive to determining that the second cell is occupied based on the sensor data, the second cell being among a set of surrounding cells in a programmed radius of the first cell;

setting a free space tested flag for the second cell to the asserted value responsive to determining that the second cell is occupied;

for the second cell of the region of interest, responsive to the free space tested flag for the second cell having the de-asserted value, setting free space tested flags of a plurality of other cells adjacent to the second cell to the asserted value and setting free space flags of the plurality of other cells adjacent to the second cell to the de-asserted value;

responsive to setting the free space tested flags of the plurality of other cells adjacent to the second cell to the asserted value, skipping setting the second cell as the cell under test;

setting a free space flag of a third cell in the region of interest to the asserted value based on the sensor data;

determining, based on the free space flag of the third cell and a dimension of a vehicle, whether sufficient contiguous unoccupied space exists in the region of interest to accommodate the vehicle; and controlling the vehicle to park in the region of interest controlling the vehicle to park in the region of interest.

12. The method of claim 11, wherein occupancy of the first cell of the region of interest is determined by performing machine-vision processing of pixels of a computer-generated image of the region of interest.

13. The method of claim 11, wherein the set of surrounding cells are cells which share a side with the first cell.

14. The method of claim 11, wherein the region of interest has first and second sides parallel to markings in the region of interest and third and fourth sides determined to be parallel to a direction of travel of the vehicle traveling adjacent to the region of interest.

15. The method of claim 14, wherein the markings delineate parking spaces.

16. The method of claim 15, further comprising: detecting the markings and applying a transformation to the region of interest based on the markings.

* * * * *